(12) United States Patent
Lee et al.

(10) Patent No.: US 12,489,166 B2
(45) Date of Patent: Dec. 2, 2025

(54) BATTERY MODULE, BATTERY PACK COMPRISING SAME, AND VEHICLE

(71) Applicant: LG ENERGY SOLUTION, LTD., Seoul (KR)

(72) Inventors: Bum-Jick Lee, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 519 days.

(21) Appl. No.: 17/922,933

(22) PCT Filed: Jul. 14, 2021

(86) PCT No.: PCT/KR2021/009067
§ 371 (c)(1),
(2) Date: Nov. 2, 2022

(87) PCT Pub. No.: WO2022/015064
PCT Pub. Date: Jan. 20, 2022

(65) Prior Publication Data
US 2023/0163397 A1    May 25, 2023

(30) Foreign Application Priority Data
Jul. 14, 2020    (KR) .......................... 10-2020-0087034

(51) Int. Cl.
*H01M 50/258* (2021.01)
*H01M 50/213* (2021.01)
*H01M 50/249* (2021.01)

(52) U.S. Cl.
CPC ....... *H01M 50/258* (2021.01); *H01M 50/213* (2021.01); *H01M 50/249* (2021.01); *H01M 2220/20* (2013.01)

(58) Field of Classification Search
CPC ............. H01M 50/258; H01M 50/249; H01M 50/213; H01M 2220/20
See application file for complete search history.

(56) References Cited

U.S. PATENT DOCUMENTS 3,147,151 A * 9/1964 Toce ................... H01M 50/258
429/163
5,981,101 A * 11/1999 Stone .................. H01M 50/262
429/96

(Continued)

FOREIGN PATENT DOCUMENTS

CN          102007618 A    4/2011
CN          206584979 U   10/2017

(Continued)

OTHER PUBLICATIONS

Machine Translation of KR-20180068158-A (May 29, 2025) (Year: 2025).*

(Continued)

*Primary Examiner* — Matthew J Merkling
(74) *Attorney, Agent, or Firm* — Morgan, Lewis & Bockius LLP (57) ABSTRACT

Disclosed is a battery module having an appropriate coupling force between internal components, reduced production cost and improved manufacture efficiency. The battery module includes a plurality of battery cells; at least two module cases respectively having an inner space accommodating the plurality of battery cells therein and having coupling portions protruding toward each other, the at least two module cases being configured such that the coupling portion of one module case makes male-and-female coupling with the coupling portion of another module case; and a first adhesive interposed between the coupling portion of the one module case and the coupling portion of the other (Continued)

module case that make male-and-female coupling with each other.

15 Claims, 9 Drawing Sheets

(56) References Cited

U.S. PATENT DOCUMENTS

| | | | |
|---|---|---|---|
| 6,410,185 | B1 | 6/2002 | Takahashi et al. |
| 6,451,475 | B1* | 9/2002 | Sherwood ............ H01M 50/204 |
| | | | 429/96 |
| 9,147,916 | B2* | 9/2015 | Bronczyk ............ H01M 10/6566 |
| 10,312,481 | B2* | 6/2019 | Shao ................... H01M 50/522 |
| 2009/0246616 | A1* | 10/2009 | Koyama ............. H01M 10/058 |
| | | | 429/153 |
| 2010/0178547 | A1* | 7/2010 | Li ....................... H01M 50/258 |
| | | | 429/151 |
| 2011/0024207 | A1 | 2/2011 | Higashino et al. |
| 2011/0256446 | A1* | 10/2011 | Bronczyk ............ H01M 10/613 |
| | | | 429/163 |
| 2013/0288094 | A1* | 10/2013 | Noh ................... H01M 10/0413 |
| | | | 429/99 |
| 2015/0349389 | A1 | 12/2015 | Kabune et al. |
| 2018/0138476 | A1 | 5/2018 | Yamazaki et al. |
| 2018/0358646 | A1 | 12/2018 | Yu et al. |
| 2018/0375074 | A1 | 12/2018 | Sugiyama et al. |
| 2019/0006646 | A1 | 1/2019 | Lee et al. |
| 2019/0372069 | A1 | 12/2019 | Lee et al. |
| 2021/0050568 | A1 | 2/2021 | Yang et al. |
| 2022/0077534 | A1* | 3/2022 | Chandan ............ H01M 50/271 |
| 2022/0231372 | A1 | 7/2022 | Kim |

FOREIGN PATENT DOCUMENTS

| | | | | |
|---|---|---|---|---|
| CN | 108475746 | A | | 8/2018 |
| CN | 207896246 | U | | 9/2018 |
| CN | 209993660 | U | | 1/2020 |
| EP | 1164645 | A1 | * 12/2001 | ............ H01M 10/06 |
| JP | 2000-294212 | A | | 10/2000 |
| JP | 2000-306562 | A | | 11/2000 |
| JP | 2008-140730 | A | | 6/2008 |
| JP | 2010-086773 | A | | 4/2010 |
| JP | 2013-12466 | A | | 1/2013 |
| JP | 2014-017168 | A | | 1/2014 |
| JP | 2015-159068 | A | | 9/2015 |
| JP | 2018-081795 | A | | 5/2018 |
| JP | 2019-216054 | A | | 12/2019 |
| KR | 10-2013-0105472 | A | | 9/2013 |
| KR | 10-2017-0011212 | A | | 2/2017 |
| KR | 10-2017-0052920 | A | | 5/2017 |
| KR | 20180068158 | A | * 6/2018 | |
| KR | 10-2018-0134055 | A | | 12/2018 |
| KR | 10-2019-0032887 | A | | 3/2019 |
| KR | 10-1995859 | B1 | | 7/2019 |
| KR | 10-2069510 | B1 | | 1/2020 |
| KR | 10-2020-0051393 | A | | 5/2020 |
| KR | 10-2120933 | B1 | | 6/2020 |
| WO | 2013-061847 | A1 | | 5/2013 |

OTHER PUBLICATIONS

Office Action issued in corresponding Japanese Patent Application No. 2022-567182, dated Dec. 25, 2023.
Office Action dated Dec. 2, 2024 issued in corresponding Taiwanese Patent Application No. 11321238960. (Note: The other references cited in the TW OA are either already of record or have counterparts that are already of record.)
The extended European Search Report, dated Jul. 10, 2024, issued in corresponding EP Patent Application No. 21841622.0.
International Search Report (with partial translation) and Written Opinion dated Oct. 25, 2021, for corresponding International Patent Application No. PCT/KR2021/009067.
The extended European Patent Report, dated May 9, 2025, issued in corresponding EP Patent Application No. 21841622.0.
Office Action issued in corresponding Chinese Patent Application No. 202180038465.4, dated Sep. 28, 2025. (Note: US 2015/0349389 A1 was previously cited.).

* cited by examiner

BATTERY MODULE, BATTERY PACK COMPRISING SAME, AND VEHICLE

TECHNICAL FIELD

The present disclosure relates to a battery module, and a battery pack and a vehicle including the same, and more particularly, to a battery module having an appropriate coupling force between internal components, reduced production cost and improved manufacture efficiency, and a battery pack and a vehicle including the same.

The present application claims priority to Korean Patent Application No. 10-2020-0087034 filed on Jul. 14, 2020 in the Republic of Korea, the disclosures of which are incorporated herein by reference.

BACKGROUND ART

Recently, with the rapid increase in demand for portable electronic products such as laptop computers, video cameras, and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

In addition, in a battery module including a plurality of battery cells, which are secondary batteries as above, when overvoltage, overcurrent or overheating occurs at the battery cells, the stability and operating efficiency of the battery module are greatly problematic, so a means for detecting and controlling them is required. As such a configuration, for example, a BMS (Battery Management System) including various elements may be used.

Here, when the battery module of the prior art includes a plurality of module cases for accommodating a plurality of battery cells, a plurality of fastening members such as bolts and nuts for coupling the module cases to each other or coupling the module case and an exterior housing are commonly used for assembling.

However, when a plurality of bolts and nuts are used, it may increase material cost and increase the weight of the battery module, and there is a disadvantage in that a lot of time is required for a large number of bolting works.

DISCLOSURE

Technical Problem

The present disclosure is designed to solve the problems of the related art, and therefore the present disclosure is directed to providing a battery module having an appropriate coupling force between internal components, reduced production cost and improved manufacture efficiency, and a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of battery cells; at least two module cases respectively configured to have an inner space for accommodating the plurality of battery cells therein and to have coupling portions protruding toward each other, the at least two module cases being configured such that the coupling portion of one module case makes male-and-female coupling with the coupling portion of another module case; and a first adhesive interposed between the coupling portion of one module case and the coupling portion of another module case that make male-and-female coupling with each other.

Also, the coupling portion of the one module case may have a pillar shape protruding outward from an outer wall thereof, and the coupling portion of the another module case may have a tube shape with a hollow so that the pillar shape of the coupling portion of the one module case is inserted therein.

In addition, the one module case may include a hook formed at the pillar shape of the coupling portion, and the another module case may include a fixing groove formed in the tube shape of the coupling portion to be coupled with the hook.

Further, the coupling portion of the one module case may have a plurality of accommodation grooves configured so that the first adhesive is accommodated therein.

Also, the coupling portion of the one module case may have a spiral groove spirally extending along an outer surface of a pillar configured so that the first adhesive is accommodated therein.

Moreover, each of the at least two module cases may include a first frame configured to accommodate one side of the plurality of battery cells; and a second frame coupled with the first frame and configured to accommodate the other side of the plurality of battery cells.

In addition, among the at least two module cases, one module case may include a first coupling protrusion provided to the first frame and configured to be coupled with the second frame of the one module case; and a first protruding portion provided to the second frame and having a coupling groove configured so that the first coupling protrusion of the first frame is inserted and coupled therein, and a second coupling protrusion provided to the second frame and configured to be coupled with the second frame of another module case.

Further, the another module case may include a first coupling protrusion provided to the first frame and configured to be coupled with the second frame of the another module case; and a first protruding portion provided to the second frame and having a coupling groove configured to be coupled with the first coupling protrusion of the another module case, and a second protruding portion having a coupling groove configured to be coupled with the second coupling protrusion of the one module case.

Also, the first frame may have a fitting groove in which a protruding end of the first protruding portion of the second frame is fitted.

Moreover, the first frame may have a slit configured so that one side of the first protruding portion of the second frame is inserted.

In addition, in another aspect of the present disclosure, there is also provided a battery pack, comprising at least one battery module as described above.

Moreover, in another aspect of the present disclosure, there is also provided a vehicle, comprising at least one battery module as described above.

Advantageous Effects

According to an embodiment of the present disclosure, since coupling portions capable of making male-and-female coupling are provided to couple at least two module cases to each other and a first adhesive is interposed between the coupling portions, it is possible to tightly couple the at least two module cases. That is, the battery module of the present disclosure may maintain a stable fixed state because relative movements of the module cases may be bound in the left and right direction and the front and rear direction by means of the coupling portions and the first adhesive. Accordingly, it is possible to effectively increase the durability of the battery module.

Moreover, compared with the prior art in which bolts are used to couple at least two module cases with each other, in the present disclosure, bolts are not necessary, and thus it is possible to reduce material cost, simplify the coupling process, and effectively increase the manufacturing efficiency.

In addition, according to an embodiment of the present disclosure, since a hook coupling may be achieved between the first frame and the second frame of one module case, namely between the first coupling protrusion and the coupling groove formed at the first protruding portion, a separate bolt is not used, and thus it is possible to reduce material cost and effectively increase the manufacturing efficiency through a simplified coupling process.

Moreover, since the second frame of another module case includes the second protruding portion configured to be coupled with the second frame of one module case and the one module case includes the second coupling protrusion coupled with the coupling groove of the second protruding portion, it is possible to achieve mechanical coupling between one module case and another module case without using a separate bolt, thereby reducing material cost and effectively increasing the manufacturing efficiency through a simplified coupling process.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
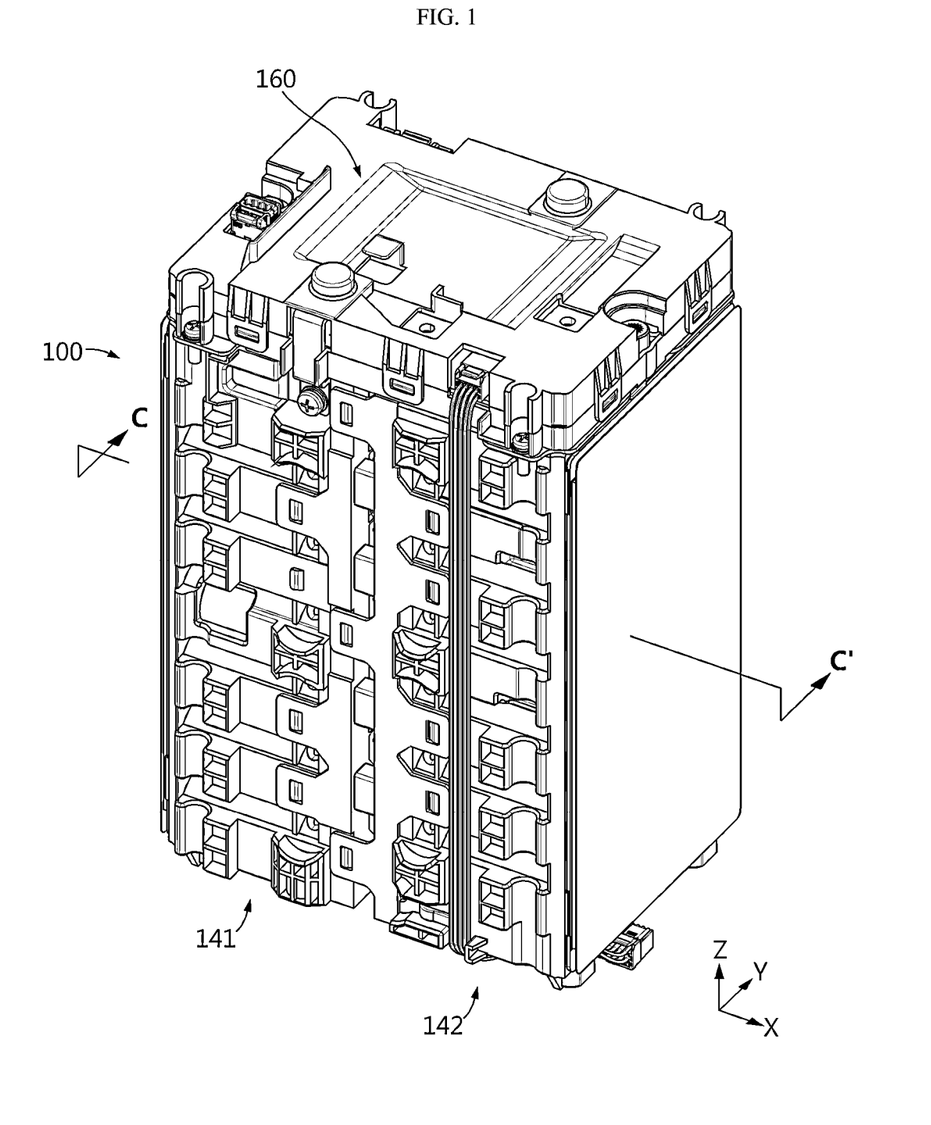
FIG. 1 is a front perspective view schematically showing a battery module according to an embodiment of the present disclosure.
Figure 2:
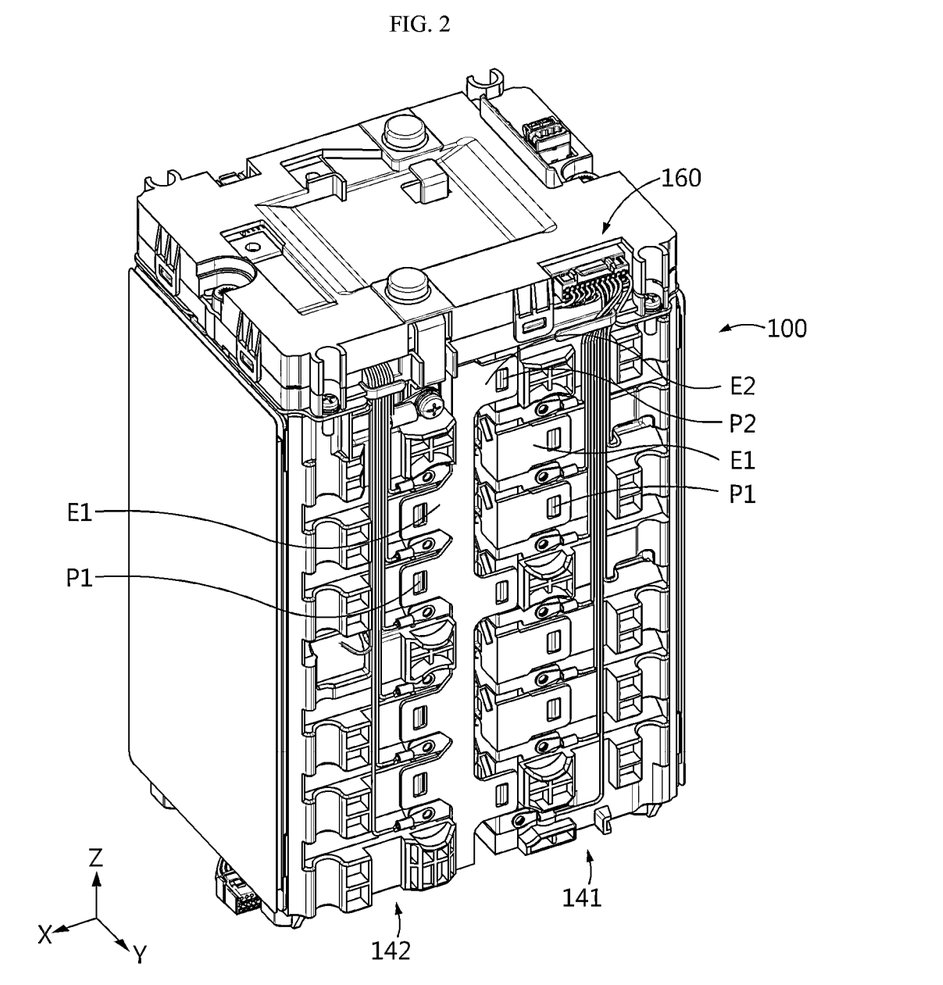
FIG. 2 is a rear perspective view schematically showing the battery module according to an embodiment of the present disclosure.
Figure 3:
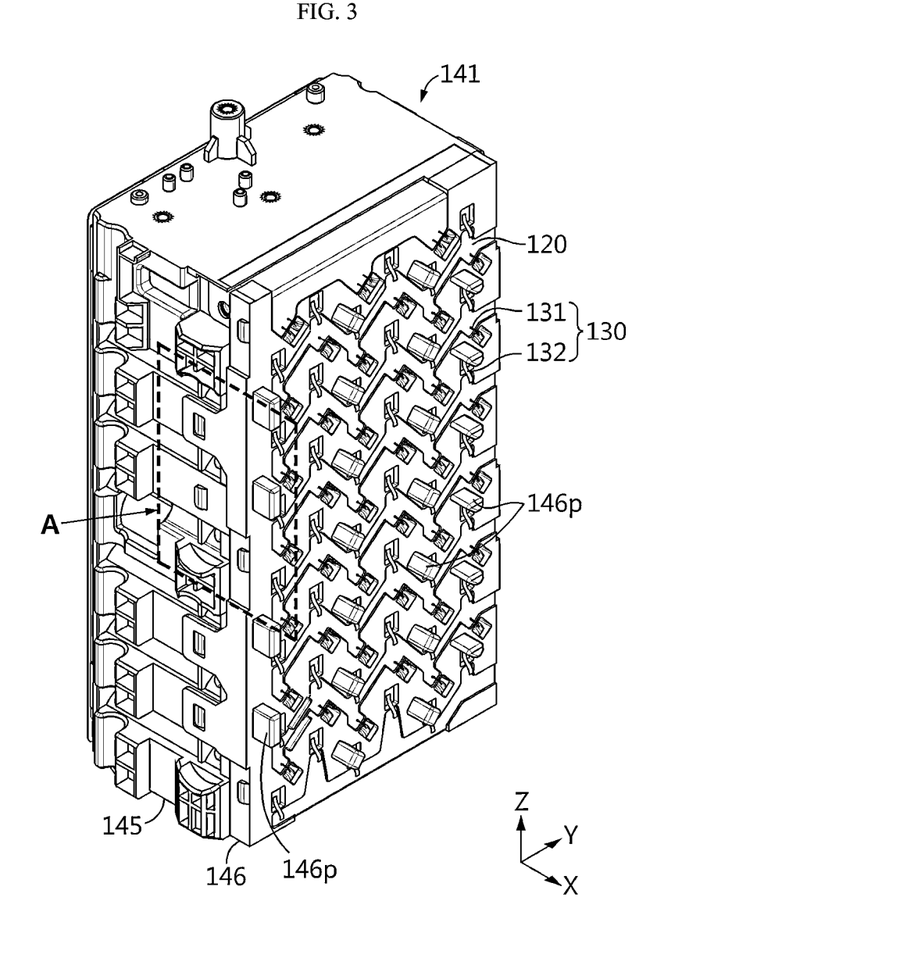
FIG. 3 is a perspective view schematically showing one module case and the like of the battery module according to an embodiment of the present disclosure.
Figure 4:
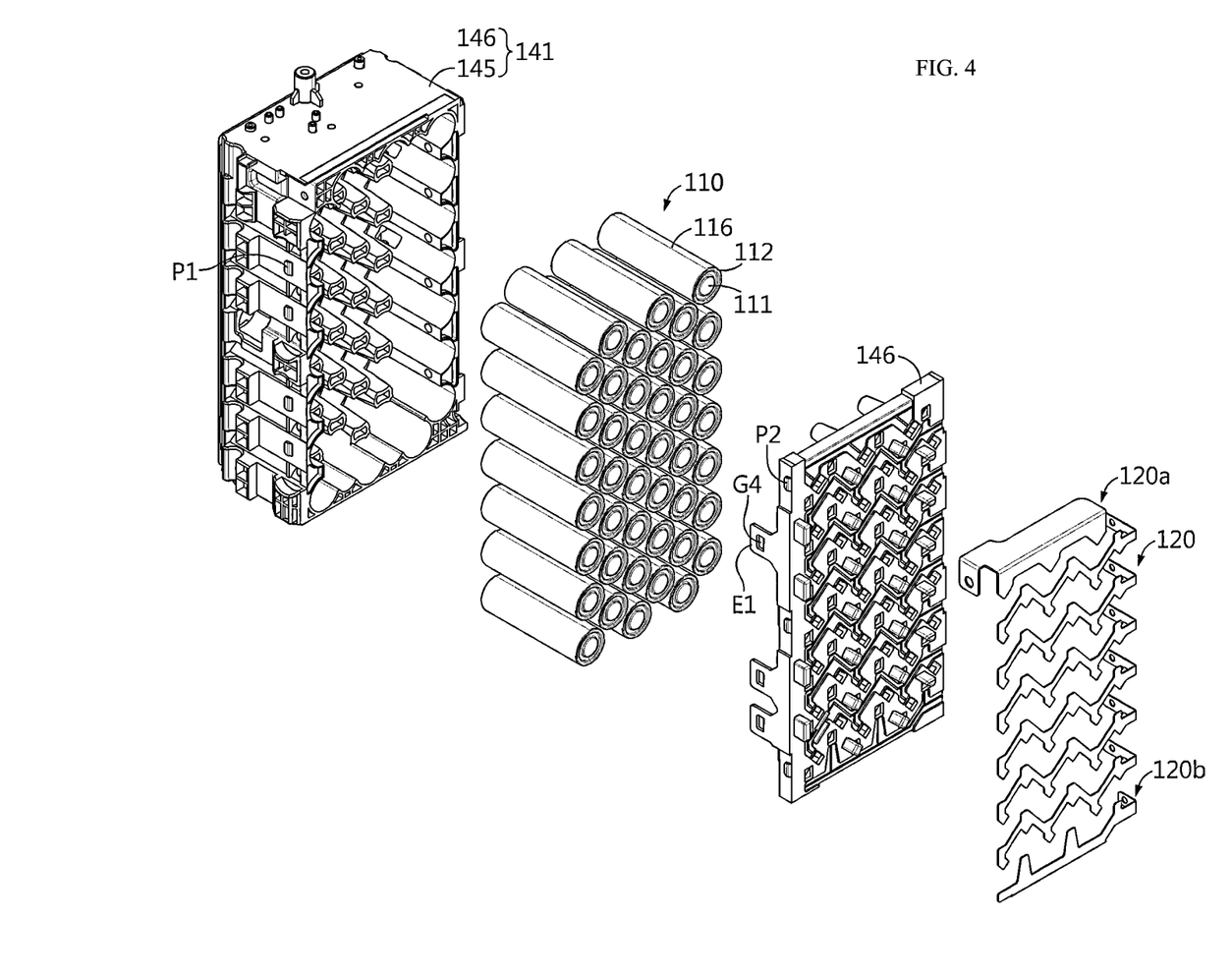
FIG. 4 is an exploded perspective view schematically showing some components of the battery module according to an embodiment of the present disclosure.
Figure 5:
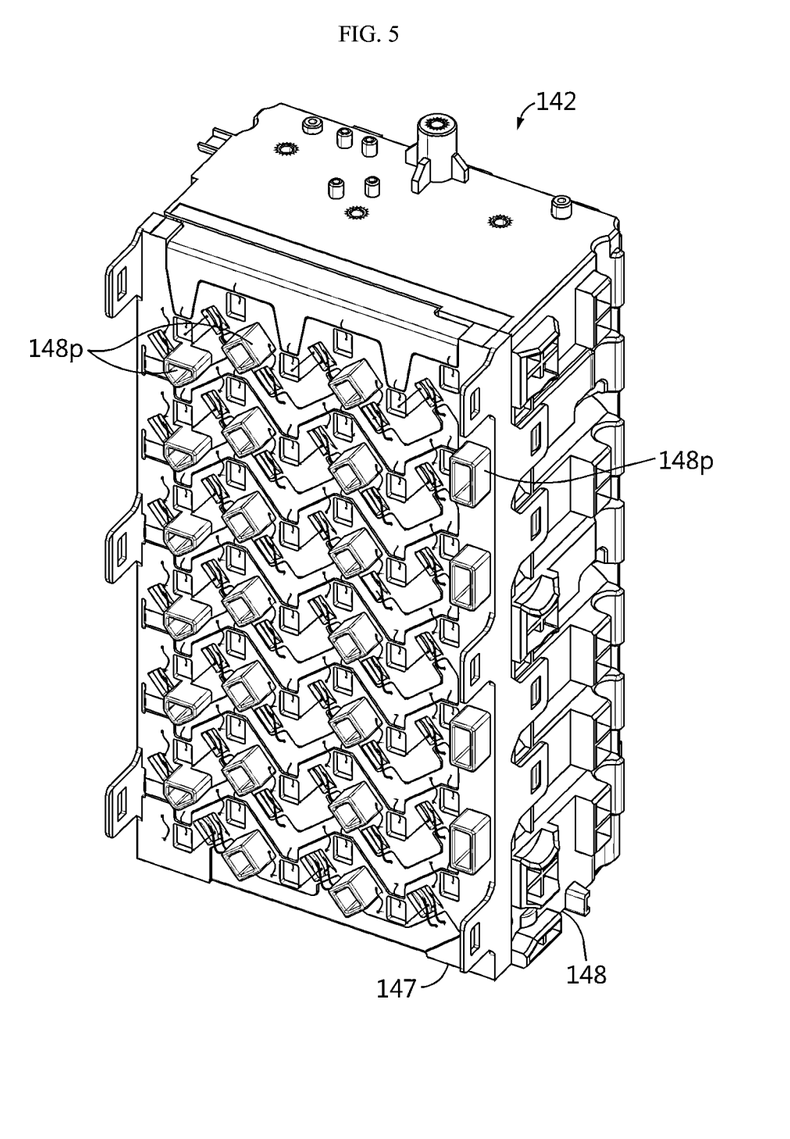
FIG. 5 is a perspective view schematically showing another module case and the like of the battery module according to an embodiment of the present disclosure.
Figure 6:
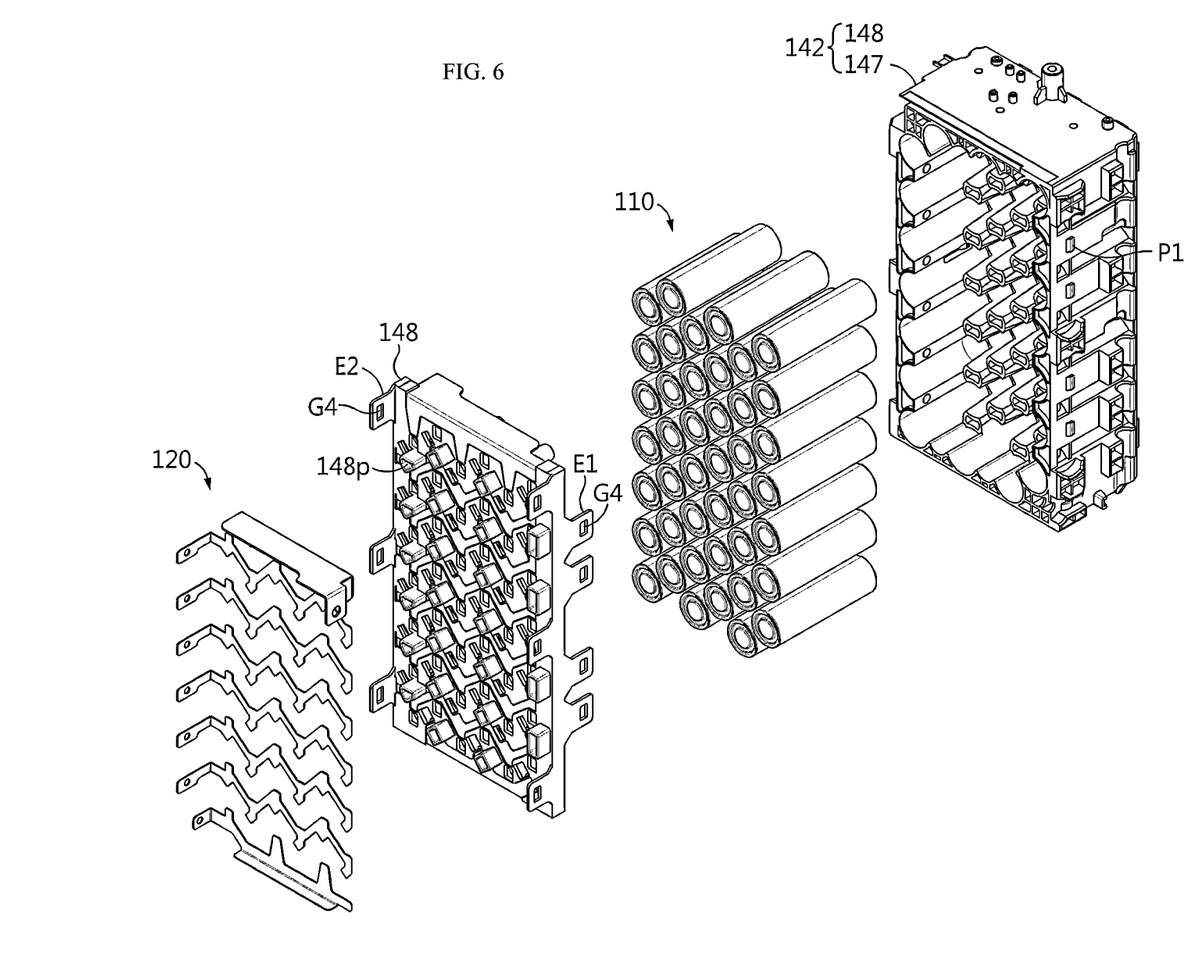
FIG. 6 is an exploded perspective view schematically showing some components of the battery module according to an embodiment of the present disclosure.
Figure 7:
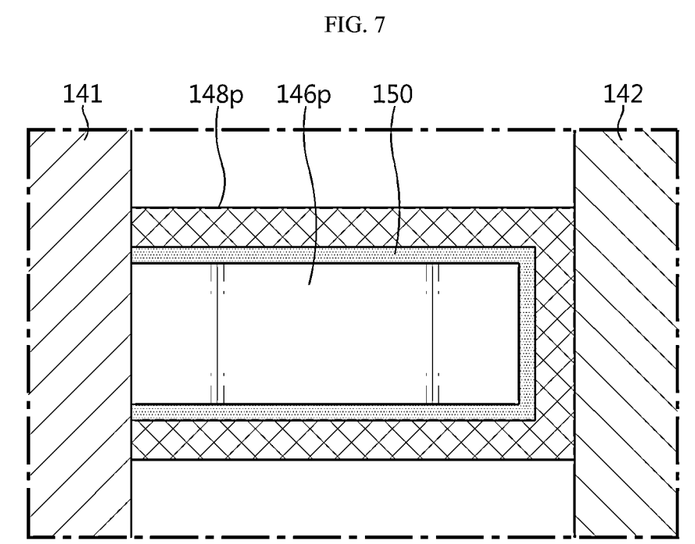
FIG. 7 is a partial sectional schematically showing a part of the battery module, taken along the C-C' line of FIG. 1.

FIG. 1 is a front perspective view schematically showing a battery module according to an embodiment of the present disclosure. FIG. 2 is a rear perspective view schematically showing the battery module according to an embodiment of the present disclosure. FIG. 3 is a perspective view schematically showing one module case and the like of the battery module according to an embodiment of the present disclosure. FIG. 4 is an exploded perspective view schematically showing some components of the battery module according to an embodiment of the present disclosure. FIG. 5 is a perspective view schematically showing another module case and the like of the battery module according to an embodiment of the present disclosure. FIG. 6 is an exploded perspective view schematically showing some components of the battery module according to an embodiment of the present disclosure. In addition, FIG. 7 is a partial sectional schematically showing a part of the battery module, taken along the C-C' line of FIG. 1.

Referring to FIGS. 1 to 7, a battery module 100 according to an embodiment of the present disclosure includes a plurality of cylindrical battery cells 110, at least two module cases 141, 142, and a first adhesive 150.

Specifically, for example, as shown in FIGS. 3 and 4, the plurality of cylindrical battery cells 110 may include a battery can 116, and a positive electrode terminal 111 and a negative electrode terminal 112 formed at one side (a right side, a positive direction of the X-axis) of a body of the battery can 116. Conversely, in the plurality of cylindrical battery cells 110 accommodated in another module case 142 of FIG. 6, a positive electrode terminal 111 and a negative electrode terminal 112 may be located at the other side (a left side, a negative direction of the X-axis in FIG. 1) of the body of the battery can 116.

In addition, the positive electrode terminal 111 may have an outer surface in a disk shape exposed to the outside. The negative electrode terminal 112 may be a rim portion at a position spaced apart from the positive electrode terminal 111. The positive electrode terminal 111 and the negative electrode terminal 112 may be spaced apart by a predetermined distance. The positive electrode terminal 111 and the negative electrode terminal 112 may be configured to be electrically insulated from each other. In addition, the portion of the positive electrode terminal 111 of the cylindrical battery cell 110 exposed to the outside may have a larger than that of the negative electrode terminal 112.

Moreover, the cylindrical battery cell 110 may include an electrode assembly (not shown) electrically connected to each of the positive electrode terminal 111 and the negative electrode terminal 112 and accommodated in the battery can 116. Such components of the cylindrical battery cell 110 are widely known to those skilled in the art at the time of filing of this application and thus will not be described in detail here.

Further, the plurality of cylindrical battery cells 110 may be arranged in the upper and lower direction (Z-axis direction) and the front and rear direction (Y-axis direction). The plurality of cylindrical battery cells 110 may be arranged to be spaced apart from each other by a predetermined interval. For example, as shown in FIG. 4, the plurality of cylindrical battery cells 110 may be arranged in the front and rear direction (Y-axis direction) and the left and right direction (X-axis direction).

In addition, each of the at least two module cases 141, 142 may have an inner space for accommodating the plurality of cylindrical battery cells 110 therein. The inner space may have an inner shape formed to surround the outer surface of the cylindrical battery cell 110.

Moreover, the at least two module cases 141, 142 may be configured to be coupled with each other. For example, as shown in FIG. 1, one module case 141 (a first module case) located at a left side and another module case 142 (a second module case) located at a right side may be coupled with each other. To this end, the at least two module cases 141, 142 may include coupling portions 146p, 148p, respectively, which protrude toward each other. The coupling portion 146p of one module case 141 among the at least two module cases 141, 142 may have a shape protruding toward the coupling portion 148p of another module case 142. The coupling portion 148p of another module case 142 may have a shape protruding toward the coupling portion 146p of the one module case 141.

In addition, the coupling portion 146p of one module case 141 may be configured to make male-and-female coupling with the coupling portion 148p of another module case 142. For example, as shown in FIG. 4, the battery module 100 may include two module cases 141, 142. Among the two module cases 141, 142, the module case 141 located at the left and the module case 142 located at the right may be coupled by means of male-and-female coupling of the coupling portions 146p, 148p respectively formed therein. A plurality of coupling portions 146p protruding in the right direction may be provided to one module case 141 located at the left side. A plurality of coupling portions 148p protruding in the left direction may be provided to another module case 142 located at the right side. The coupling portions 146p of one module case 141 located at the left side and the coupling portions 148p of another module case 142 located at the right side may make male-and-female coupling with each other.

Referring to FIG. 7 along with FIGS. 1 and 3, the first adhesive 150 may be configured to be interposed between the coupling portion 146p of one module case 141 and the coupling portion 148p of another module case 142, which make male-and-female coupling with each other. For example, as shown in FIG. 7, the coupling portion 146p of one module case 141 and the coupling portion 148p of another module case 142 make male-and-female coupling with each other, and the first adhesive 150 may be interposed between the two coupling portions 146p, 148p.

For example, the first adhesive 150 may be a solidified adhesive. The adhesive 150 may have transparency and electrical insulation. The first adhesive 150 may be a glue or a hot-melt resin. For example, the first adhesive 150 may include at least one of a polyamide-based resin, a polyimide-based resin, an epoxy-based resin, and an acrylic resin.

Also, after the first adhesive 150 is applied to an empty space inside the coupling portion 148p of the another module case 142, the coupling portion 146p of the one module case 141 may be inserted into the empty space inside the coupling portion 148p of the another module case 142. In this insertion process, the first adhesive 150 may be interposed between the coupling portion 146p of one module case 141 and the coupling portion 148p of another module case 142.

Therefore, according to this configuration of the present disclosure, in the present disclosure, since the coupling portions 146p, 148p making male-and-female coupling with each other are provided to couple at least two module cases 141, 142 with each other and the first adhesive 150 is interposed between the coupling portions 146p, 148p, it is possible to firmly couple the at least two module cases 141, 142. That is, the battery module of the present disclosure may maintain a stable fixation state because relative movements of the module cases 141, 142 may be bound in the left and right direction and the front and rear directions by means of the coupling portions 146p, 148p and the first adhesive 150. Accordingly, it is possible to effectively increase the durability of the battery module 100.

Moreover, compared with the prior art in which bolts are used to couple at least two module cases 141, 142 with each other, in the present disclosure, bolts are not necessary, and thus it is possible to reduce material cost, simplify the coupling process, and effectively increase the manufacturing efficiency.

Referring to FIGS. 3, 5 and 7 again, more specifically, the coupling portion 146p of the one module case 141 may have a pillar shape protruding outward from an outer wall thereof. The coupling portion 146p of the one module case 141 may have a pillar shape to be inserted into a tube shape of the coupling portion 148p of another module case 142. In this case, the pillar shape may be a circular pillar shape, a triangular pillar shape, a rectangular pillar shape, or a pentagonal pillar shape.

In addition, the coupling portion 148p of the another module case 142 may have an inner space of a size corresponding to the outer shape of the coupling portion 146p of the one module case 141. For example, the coupling portion 148p of the another module case 142 may have a tube shape (hollow) having an empty inside so that the pillar shape of the coupling portion 146p of the one module case 141 is inserted therein. The coupling portion 148p of the another module case 142 may have a circular tube shape, a triangular tube shape, a rectangular tube shape, or a pentagonal tube shape with one side blocked.

For example, as shown in FIGS. 3, 5 and 7, any one of the coupling portions 146p of the one module case 141 may have a rectangular pillar shape. Among the coupling portions 148p of the another module case 142, the coupling portion 148p corresponding to the coupling portion 146p having a rectangular pillar shape may have a rectangular tube shape with one side blocked. The coupling portion 146p of one module case 141 may be inserted into the inner space of the coupling portion 148p of another module case 142 having a rectangular tube shape. In this case, the coupling portion 146p of one module case 141 and the coupling portion 148p of the another module case 142 may be bound to each other by the first adhesive 150.

Therefore, according to this configuration of the present disclosure, in the present disclosure, since the coupling portion 146p of one module case 141 has a pillar shape and the coupling portion 148p of another module case 142 has a tube shape, the two coupling portions 146p, 148p may make male-and-female coupling with each other. In addition, since relative movements of the at least two module cases 141, 142 of the present disclosure may be constrained in the left and right direction and the upper and lower direction by the form of these coupling portions 146p, 148p, it is possible to maintain a stable fixed state. Accordingly, the durability of the battery module 100 may be effectively increased.

Figure 8:
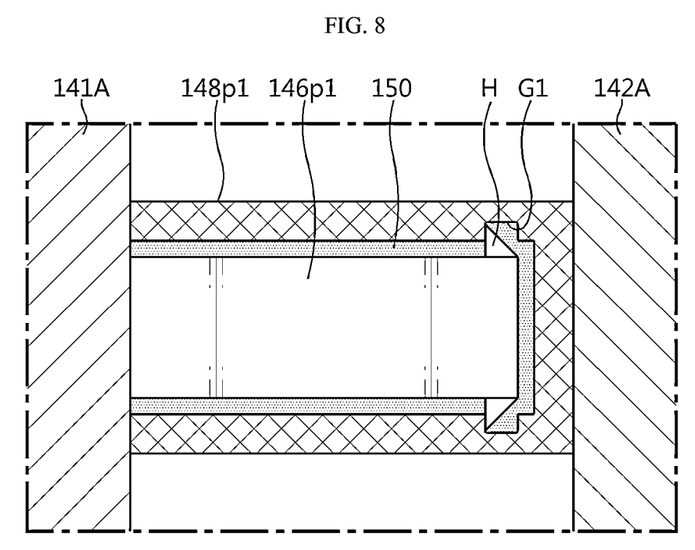
FIG. 8 is a partial sectional schematically showing a part of a battery module according to another embodiment of the present disclosure.

FIG. 8 is a partial sectional schematically showing a part of a battery module according to another embodiment of the present disclosure.

Referring to FIG. 8, coupling portions 146p1, 148p1 of the battery module according to another embodiment of the present disclosure may have different shapes from the coupling portions 146p, 148p shown in FIG. 7. Other configurations are the same as those of the battery module 100 shown in FIG. 1.

Specifically, at least two module cases 141A, 142A of the battery module according to another embodiment of the present disclosure may have a hook H provided to the coupling portion 146p1 of the pillar shape of the one module case 141A. The hook H may have a protrusion shape protruding outward from the pillar-shaped outer surface of the coupling portion 146p1. In addition, the coupling portion 148p1 of another module case 142A having a tube shape may have a fixing groove G1 capable of being coupled with the hook H. That is, the fixing groove G1 may be formed in the inner space of the tube shape of the coupling portion 148p1. The fixing groove G1 may be provided in a groove shape of a predetermined size so that the hook H may be hooked and mounted therein.

For example, as shown in FIG. 8, the coupling portion 148p1 provided to one module case 141A of the battery module according to another embodiment of the present disclosure may have two hooks H. The coupling portion 148p of another module case 142A may have two fixing grooves G1 so that the two hooks H are inserted and hooked in the tube shape.

Therefore, according to this configuration of the present disclosure, since the coupling portions 146p, 148p provided to the at least two module cases 141A, 142A of the battery module 100 according to another embodiment of the present disclosure have the hook H and the fixing groove G1, respectively, As a result, the two coupling portions 146p, 148p may be mechanically fastened. Accordingly, it is possible to achieve a strong coupling between the at least two module cases 141A, 142A, thereby effectively increasing the durability of the battery module.

In this embodiment, the fastening force between the at least two module cases 141A, 142A may be further improved by means of the hook H and the fixing groove G1 for hooking of the hook H.

Accordingly, in this embodiment, compared to the prior art in which bolts are used to couple at least two module cases 141A, 142A with each other, additional bolts or nuts are not necessary by using hook coupling through the hook H and the fixing groove G1, and thus it is possible to reduce material cost and simplify the coupling process, thereby effectively increasing the manufacturing efficiency.

Therefore, in this embodiment, since separate bolts and nuts are not used, it is possible to reduce material cost and effectively increase the manufacture efficiency through a simplified coupling process.

Figure 9:
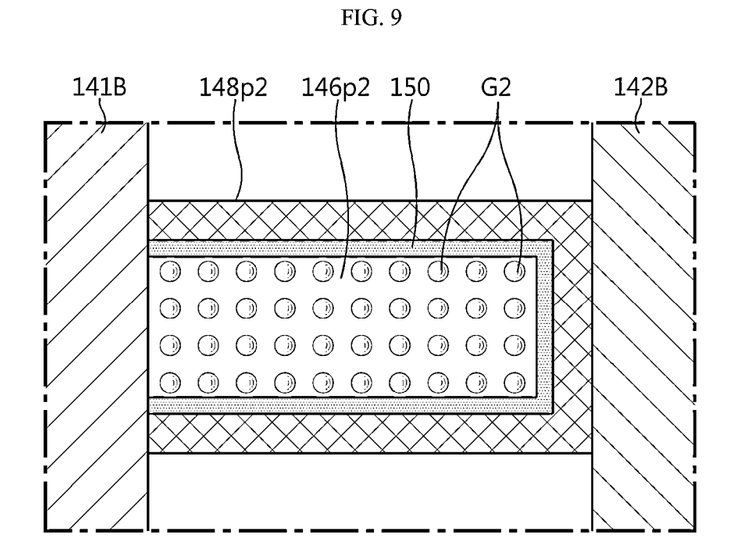
FIG. 9 is a partial sectional schematically showing a part of a battery module according to still another embodiment of the present disclosure.

FIG. 9 is a partial sectional schematically showing a part of a battery module according to still another embodiment of the present disclosure.

Referring to FIG. 9, a coupling portion 146p2 of the battery module according to still another embodiment of the present disclosure may have a different form from the coupling portion 146p shown in FIG. 7. Other configurations are the same as those of the battery module 100 shown in FIG. 1.

Specifically, in at least two module cases 141B, 142B of the battery module according to another embodiment of the present disclosure, a plurality of accommodation groove G2s configured to accommodate the first adhesive 150 may be formed at the coupling portion 146p2 of the one module case 141B. For example, the accommodation grooves G2 may have a shape such as dimples formed on the surface of a golf ball.

For example, as shown in FIG. 9, when the coupling portion 146p2 of the one module case 141B is inserted into the inner space of the coupling portion 148p2 of the another module case 142B having a tube shape, the first adhesive 150 added to the inner space of the coupling portion 148p2 having a tube shape may be accommodated in the inner space of the accommodation grooves G2 of the another module case 142B. Accordingly, a sufficient amount of the first adhesive 150 may be accommodated between the coupling portion 146p2 of the one module case 141B and the coupling portion 148p2 of the another module case 142B.

Therefore, according to this configuration of the present disclosure, in the present disclosure, since a plurality of accommodation grooves G2 configured to accommodate the first adhesive 150 are formed at the coupling portion 146p2 of one module case 141B, a sufficient amount of the first adhesive 150 may be accommodated on the surface of the coupling portion, and thus it is possible to effectively improve the coupling force between the coupling portion 146p2 of the one module case 141B and the coupling portion 148p2 of the another module case 142B. Accordingly, it is possible to achieve a strong coupling between the at least two module cases 141B, 142B, thereby effectively increasing the durability of the battery module.

Figure 10:
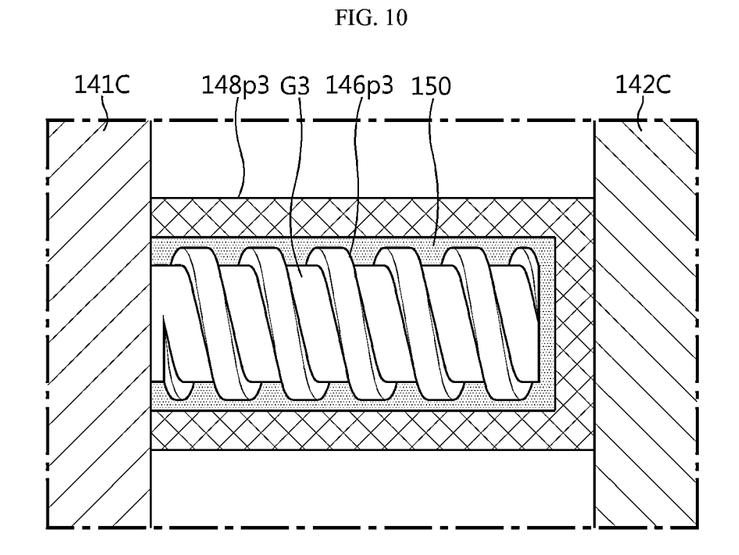
FIG. 10 is a partial sectional schematically showing a part of a battery module according to further another embodiment of the present disclosure.

FIG. 10 is a partial sectional schematically showing a part of a battery module according to further another embodiment of the present disclosure.

Referring to FIG. 10, a coupling portion 146p3 of the battery module according to further another embodiment of the present disclosure may have a different form from the coupling portion 146p shown in FIG. 7. Other configurations are the same as those of the battery module 100 shown in FIG. 1.

In the coupling portion 146p3 of the one module case 141C of the battery module according to further another embodiment of the present disclosure, a spiral groove G3 spirally extending along the outer surface of the pillar configured to accommodate the first adhesive 150 may be formed. When the coupling portion 146p3 of the one module case 141C is inserted into the inner space of coupling portion 148p3 of another module case 142C having a tube shape, the spiral groove G3 may be configured such that the first adhesive 150 accommodated in the inner space of the coupling portion 148p3 of another module case 142C may be accommodated therein. The first adhesive 150 accommodated in the spiral groove G3 may be cured to bind the coupling portion 146p3 of the one module case 141C and the coupling portion 148p3 of the another module case 142C.

Therefore, according to this configuration of the present disclosure, in the present disclosure, by forming the spiral groove G3 at the coupling portion 146p3 of one module case 141C, the first adhesive 150 may be cured along the spiral groove G3, and thus it is possible to effectively block the force by which the coupling portion 146p3 of the one module case 141C inserted into the coupling portion 148p3 of the another module case 142C is separated in a direction opposite to the insertion direction. Accordingly, it is possible to achieve a strong coupling between the at least two module cases 141C, 142C, thereby effectively increasing the durability of the battery module.

Referring to FIGS. 1 to 6 again, the at least two module cases 141, 142 of the battery module 100 according to an embodiment of the present disclosure may include first frames 145, 147, and second frames 146, 148, respectively. Specifically, the first frame 145 may be configured to accommodate one side of the plurality of cylindrical battery cells 110. The second frame 146 may be coupled to the first frame 145 and configured to accommodate the other side of the plurality of cylindrical battery cells 110.

For example, as shown in FIG. 4, one module case 141 located at the left side may include a first frame 145 configured to accommodate the left side of the plurality of cylindrical battery cells 110, and a second frame 146 coupled to the first frame 145 and configured to accommodate the right side of the plurality of cylindrical battery cells 110. In this case, a second adhesive (not shown) for fixing the plurality of cylindrical battery cells 110 may be filled inside the one module case 141.

For example, as shown in FIG. 6, the another module case 142 located at the right side may include a first frame 147 configured to accommodate the right side of the plurality of cylindrical battery cells 110, and a second frame 148 coupled to the first frame 147 and configured to accommodate the left side of the plurality of cylindrical battery cells 110. In this case, a second adhesive (not shown) for fixing the plurality of cylindrical battery cells 110 may be filled inside the another module case 142.

In addition, among the at least two module cases 141, 142, one module case 141 may include a first coupling protrusion P1 at the first frame 145. The first coupling protrusion P1 may be configured to be coupled with the second frame 146 of the one module case 141. For example, as shown in FIG. 4, four first coupling protrusions P1 may be provided on the front surface of the first frame in the front and rear direction (Y-axis direction). As shown in FIG. 2, four first coupling protrusions P1 may also be provided on the rear surface of the first frame.

In addition, the one module case 141 may include a first protruding portion E1 and a second coupling protrusion P2 at the second frame 146. The first protruding portion E1 may have a coupling groove G4 configured so that the first coupling protrusion P1 of the first frame 145 of the one module case 141I inserted and coupled therein. The first protruding portion E1 may have a shape protruding toward the first coupling protrusion P1 of the first frame 145. The second coupling protrusion P2 may be configured to be coupled with the second frame 148 of the another module case 142. For example, as shown in FIG. 4, three first protruding portions E1 may be provided on the front surface of the second frame 146 of the one module case 141. As shown in FIG. 2, three first protruding portions E1 may also be provided on the rear surface of the second frame 146 of the one module case 141.

Moreover, as shown in FIG. 6, among the at least two module cases 141, 142, another module case 142 may include a first coupling protrusion P1 at the first frame 147. The first coupling protrusion P1 may be configured to be coupled with the second frame 148 of the another module case 14.

For example, as shown in FIG. 6, four first coupling protrusions P1 may be provided on the front surface of the first frame 147 of the another module case 142 located at the right side. In addition, as shown in FIG. 2, four first coupling protrusions P1 may also be provided on the rear surface of the second frame 148.

In addition, the another module case 142 may include a first protruding portion E1 and a second protruding portion E2 at the second frame 148 of the another module case 142. The first protruding portion E1 may have a coupling groove G4 configured to be coupled with the first coupling protrusion P1 of the another module case 142. The second protruding portion E2 may have a coupling groove G4 configured to be coupled with the second coupling protrusion P2 of the second frame 146 of the one module case 141.

For example, as shown in FIG. 6, four first protruding portions E1 may be provided at the front portion of the second frame 148 of the another module case 142. As shown in FIG. 2, four first protruding portions E1 may also be provided at the rear portion of the second frame of the another module case 142. Also, as shown in FIG. 6, three second protruding portions E2 may be provided at the front portion of the second frame 148 of the another module case 142. As shown in FIG. 2, three second protruding portions E2 may be provided at the rear portion of the second frame 148 of the another module case 142.

Therefore, according to this configuration of the present disclosure, in the present disclosure, since a hook coupling may be achieved between the first frame 145 and the second frame 146 of one module case 141, namely between the first coupling protrusion P1 and the coupling groove G4 formed at the first protruding portion E1, a separate bolt is not used, and thus it is possible to reduce material cost and effectively increase the manufacturing efficiency through a simplified coupling process. Moreover, since the second frame 148 of another module case 142 includes the second protruding portion E2 configured to be coupled with the second frame 146 of one module case 141 and the one module case 141 includes the second coupling protrusion P2 coupled with the coupling groove G4 of the second protruding portion E2, it is possible to achieve mechanical coupling between one module case 141 and another module case 142 without using a separate bolt, thereby reducing material cost and effectively increasing the manufacturing efficiency through a simplified coupling process.

Figure 11:
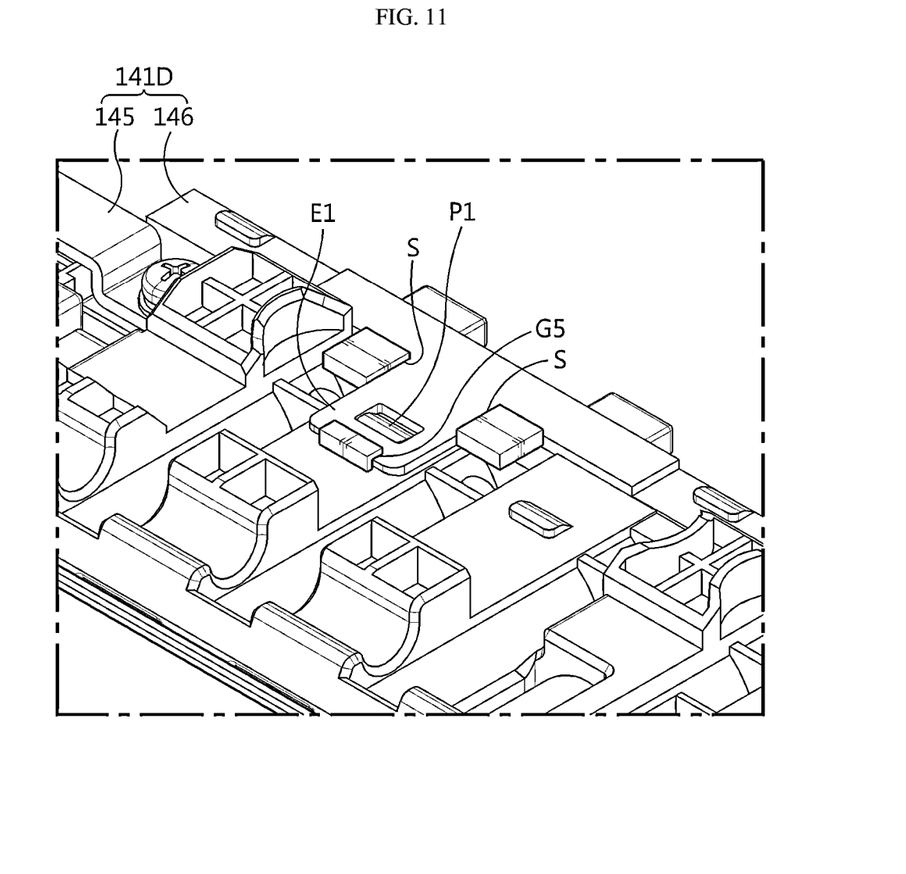
FIG. 11 is an enlarged view schematically showing a part of a battery module according to still further another embodiment, which corresponds to a region A of FIG. 3.

FIG. 11 is an enlarged view schematically showing a part of a battery module according to still further another embodiment, which corresponds to a region A of FIG. 3.

Referring to FIG. 11 along with FIG. 3, the first frame 145 of one module case 141D of a battery module according to still further another embodiment of the present disclosure may further include a fitting groove G5 so that a protruding end of the first protruding portion E1 of the second frame 146 described above is fitted therein, compared with the one module case 141 of FIG. 3. For example, the first frame 145 may have three fitting grooves G5 so that the ends of the three first protruding portions E1 are fitted therein, respectively. The fitting groove G5 may be a part of the one module case 141D protruding from the outer surface thereof in the form of an 'F'.

Therefore, according to this configuration of the present disclosure, in the present disclosure, since the first frame 145 has the fitting groove G5 so that the protruding end of the first protruding portion E1 of the second frame 146 is fitted therein, it is possible to effectively prevent the first protruding portion E1 of the second frame 146 from being separated from the first coupling protrusion P1 provided at the first frame 145 as the first protruding portion E1 of the second frame 146 is spread forward or rearward. Accordingly, it is possible to achieve a stable coupling between the first frame 145 and the second frame 146 of the one module case 141D, thereby effectively increasing the durability of the battery module.

Meanwhile, referring to FIG. 11 along with FIG. 3, the first frame 145 of one module case 141D of the battery module according to another embodiment of the present disclosure may have a slit S configured so that a side portion of the first protruding portion E1 of the second frame is inserted therein, compared with the one module case 141 of FIG. 3. For example, as shown in FIG. 11, the first frame 145 may have two slits S. The two slits S may be configured so that both sides of the first protruding portion E1 of the second frame 146 in the upper and lower direction (Z-axis direction) are respectively inserted therein. The slit S may be formed by indenting a portion of the one module case 141D in a shape protruding outward from the outer surface. Here, the indented shape may correspond to the end of the first protruding portion E1.

Therefore, according to this configuration of the present disclosure, in the present disclosure, since the first frame 145 has the slit S configured so that the side of the first protruding portion E1 of the second frame 146 is inserted therein, the first protruding portion E1 of the second frame 146 may guide the movement direction of the first frame 145 moving toward the first coupling protrusion P1. Moreover, it is possible to effectively prevent that the first protruding portion E1 is separated from the first coupling protrusion P1 provided to the first frame 145 as the first protruding portion E1 of the second frame 146 is spread forward or backward. Accordingly, it is possible to achieve a stable coupling between the first frame 145 and the second frame 146 of the one module case 141D, thereby effectively increasing the durability of the battery module.

Meanwhile, referring to FIGS. 4 and 6 again, the battery module 100 further includes a bus bar 120 configured to electrically connect the plurality of cylindrical battery cells 110. The bus bar 120 may include an electrically conductive material. For example, the bus bar 120 may include at least one of a copper alloy, an aluminum alloy, and a nickel alloy. The bus bar 120 may have a plate shape. The bus bar 120 may have a shape in which a portion thereof is bent at least once.

In addition, the bus bar 120 may be mounted to an outside of the module case 141. In this case, a third adhesive (not shown) may be interposed between the bus bar 120 and the module case 141. For example, as shown in FIGS. 3 and 4, eight bus bars 120 may be mounted at the right side of the module case 141. At this time, among the 8 bus bars 120, the bus bars 120a, 120b located at the top and bottom, respectively, may have a different shape from the other 6 bus bars 120. In addition, the bus bars 120 positioned at the top and bottom may be configured to electrically connect only the positive electrode terminals 111 or the negative electrode terminals 112 of the plurality of cylindrical battery cells 110. The remaining six bus bars 120 will be described later in more detail.

Meanwhile, referring to FIGS. 3 and 4 again, each of the at least two or more types of connection members 130 may include an electrically conductive material. For example, the connection member 130 may include at least one of a copper alloy, an aluminum alloy, and a nickel alloy. The connection member 130 may have an elongated body. In other words, the connection member 130 may have a strip shape or a wire shape with an elongated body. One end of the connection member 130 at which the body extends may be bonded to the bus bar 120. In addition, one end of the connection member 130 may be welded to the outer surface of the bus bar 120. For example, the welding method may be ultrasonic welding.

In addition, the other end of the connection member 130 may be bonded to any one of the positive electrode terminal 111 and the negative electrode terminal 112. At this time, the other end of the connection member 130 may be welded to the outer surface of the positive electrode terminal 111 or the negative electrode terminal 112. For example, the welding method may be ultrasonic welding.

In addition, the at least two or more types of connection members 130 may include a first connection member 131 connected to the negative electrode terminal 112, and a second connection member 132 connected to the positive electrode terminal 111. For example, as shown in FIG. 3, one end of the first connection member 131 may be bonded to the bus bar 120, and the other end thereof may be bonded to the negative electrode terminal 112 of the cylindrical battery cell 110. One end of the second connection member 132 may be bonded to the bus bar 120, and the other end thereof may be bonded to the positive electrode terminal 111 of the cylindrical battery cell 110.

The first connection member 131 may have a wire shape elongated in the longitudinal direction. For example, as shown in FIG. 3, one end of the wire shape of the first connection member 131 may be bonded to the bus bar 120. The other end of the wire shape of the first connection member 131 may be bonded to the negative electrode terminal 112. Since the wire shape has a shape elongated in the longitudinal direction with a narrow diameter, the first connection member 131 has a shape optimized for bonding with the negative electrode terminal 112, which has a narrow outer surface exposed to the outside, compared to the positive electrode terminal 111.

The second connection member 132 may have a strap shape elongated in the longitudinal direction. For example, as shown in FIG. 3, one end of the strap shape of the second connection member 132 may be bonded to the bus bar 120. The other end of the strap shape of the second connection member 132 may be bonded to the positive electrode terminal 111. The second connection member 132 may have a plate shape that is rectangular in a plan view. One surface of the other end of the second connection member 132 facing the positive electrode terminal 111 may be bonded to the outer surface of the positive electrode terminal 111. One surface of one end of the second connection member 132 facing the bus bar 120 may be bonded to the outer surface of the bus bar 120.

Therefore, according to this configuration of the present disclosure, since the present disclosure includes the bus bar 120 and the at least two or more types of connection members 130 having a different bonding area depending on the terminal to be bonded among the positive electrode terminal 111 and the negative electrode terminal 112, the bonding area between the connection member 130 and the positive electrode terminal 111 or the negative electrode terminal 112 may be optimized.

That is, compared to the prior art in which the bus bar 120 is connected to the positive electrode terminal 111 or the negative electrode terminal 112 using a single type of connection member 130, in the present disclosure, the bonding area may be set differently depending on the type of terminal to which at least two or more types of connection members 130 are bonded. Accordingly, in the present disclosure, even when the battery module 100 is mounted to a vehicle exposed to an environment where frequent vibrations and shocks occur, it is possible to effectively prevent the bonding portion between the connection member 130 and the positive electrode terminal 111 or the negative electrode terminal 112 from being separated. Ultimately, the durability of the battery module 100 may be effectively improved.

Meanwhile, referring to FIG. 1, a battery pack according to an embodiment of the present disclosure may include at least one battery module 100 as described above and a battery management system (BMS) 160 electrically connected to the bus bar 120 of the battery module 100. The BMS 160 may include various circuits or elements to control charging and discharging of the plurality of battery cells.

Meanwhile, a vehicle (not shown) according to an embodiment of the present disclosure may include at least one battery module 100 as described above and an accommodation space for accommodating the battery module 100. For example, the vehicle may be an electric vehicle, an electric scooter, an electric wheelchair, or an electric bike.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   at least two module cases having one module case and another module case, wherein each of the one module case and the another module case has an inner space accommodating a plurality of battery cells and has a coupling portion, wherein the coupling portions protrude toward each other, and wherein the coupling portion of the one module case and the coupling portion of the another module case make male-and-female coupling in a first direction without using bolts; and
   a first adhesive interposed between the coupling portion of the one module case and the coupling portion of the another module case that make the male-and-female coupling with each other,
   wherein:
   the plurality of battery cells of the one module case are disposed within a first area in a first plane defined by a second direction and a third direction, the second and third directions being perpendicular to the first direction; and
   the coupling portion of the one module case overlaps the first area along the first direction.

2. The battery module according to claim 1, wherein the coupling portion of the one module case has a pillar shape protruding outward from an outer wall thereof, and
   wherein the coupling portion of the another module case has a tube shape with a hollow so that the pillar shape of the coupling portion of the one module case is inserted therein.

3. The battery module according to claim 2, wherein the one module case includes a hook at the pillar shape of the coupling portion, and
   wherein the another module case includes a fixing groove disposed in the tube shape of the coupling portion to be coupled with the hook.

4. The battery module according to claim 2, wherein the coupling portion of the one module case has a plurality of accommodation grooves so that the first adhesive is accommodated therein.

5. The battery module according to claim 2, wherein the coupling portion of the one module case has a spiral groove spirally extending along an outer surface of a pillar configured so that the first adhesive is accommodated therein.

6. The battery module according to claim 1, wherein each of the one module case and the another module case includes:
   a first frame in which one side of the respective plurality of battery cells is accommodated; and
   a second frame coupled with the first frame such that another side of the respective plurality of battery cells is accommodated.

7. The battery module according to claim 6, wherein among the at least two module cases, the one module case includes:
   a first coupling protrusion provided to the first frame of the one module case and coupled with the second frame of the one module case;
   a first protruding portion provided to the second frame of the one module case and having a coupling groove so that the first coupling protrusion of the first frame of the one module case is inserted and coupled therein; and
   a second coupling protrusion provided to the second frame of the one module case and configured to be coupled with the second frame of the another module case, and
   wherein the another module case includes:
   a first coupling protrusion provided to the first frame of the another module case and coupled with the second frame of the another module case;
   a first protruding portion provided to the second frame of the another module case and having a coupling groove coupled with the first coupling protrusion of the another module case; and
   a second protruding portion having a coupling groove coupled with the second coupling protrusion of the one module case.

8. The battery module according to claim 7, wherein the first frame of the one module case has a fitting groove in which a protruding end of the first protruding portion of the second frame of the one module case is fitted.

9. The battery module according to claim 7, wherein the first frame of the one module case has a slit in which one side of the first protruding portion of the second frame of the one module case is inserted.

10. A battery pack, comprising at least one battery module according to claim 1.

11. A vehicle, comprising at least one battery module according to claim 1.

12. The battery module according to claim 1, wherein the coupling portion of the one module case and the coupling portion of the another module case are disposed along the first direction between the plurality of battery cells of the one module case and the plurality of battery cells of the another module case.

13. The battery module according to claim 1, wherein:
the one module case entirely accommodates the plurality of battery cells of the one module case; and
the plurality of battery cells of the one module case are separate from the plurality of battery cells of the another module case.

14. The battery module according to claim 1, wherein positive electrode terminals and negative electrode terminals of the plurality of battery cells of the one module case face the plurality of battery cells of the another module case.

15. The battery module according to claim 1, wherein the coupling portion of the another module case has a tube shape with a hollow, the hollow having one end that is open and another end that is closed, the another end being opposite the one end.

* * * * *